Figures 1, 2, 3:
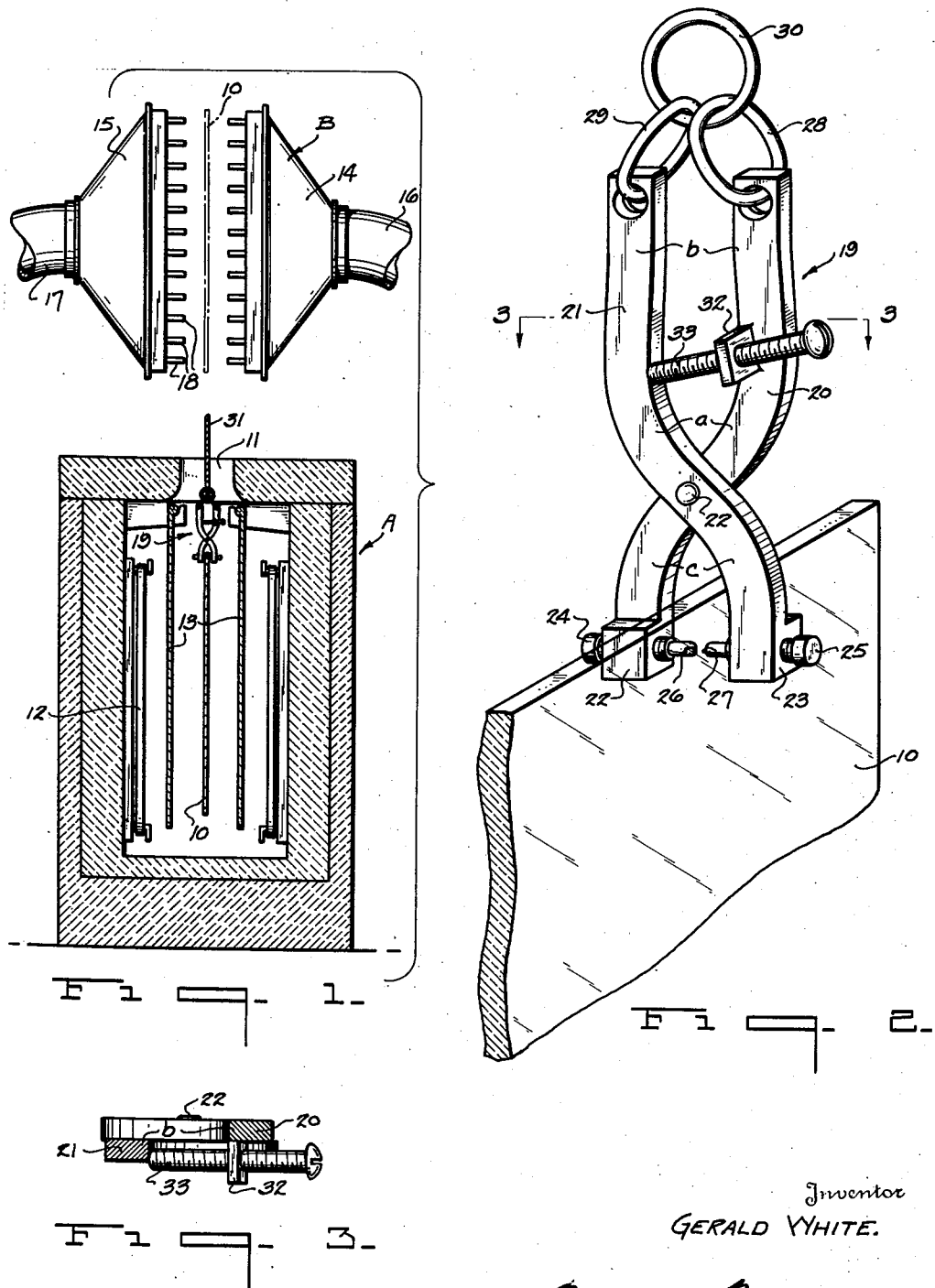

Nov. 30, 1937. G. WHITE 2,100,497

TONG

Filed Oct. 5, 1935

Inventor
GERALD WHITE.

By Frank Fraser
Attorney

Patented Nov. 30, 1937

2,100,497

UNITED STATES PATENT OFFICE 2,100,497

TONG

Gerald White, Toledo, Ohio, assignor to Libbey-Owens-Ford Glass Company, Toledo, Ohio, a corporation of Ohio Application October 5, 1935, Serial No. 43,654

4 Claims. (Cl. 294—118)

The present invention relates generally to tongs and more particularly to an improved type of tong primarily adapted for supporting glass sheets during the tempering thereof, although not necessarily restricted to such use.

In the tempering of glass sheets according to one well known process, the sheets are first heated to approximately the point of softening of the glass and then suddenly chilled to place the outer surfaces of the said sheets under compression and the interiors thereof under tension. The treatment of glass sheets in this manner not only materially increases the mechanical strength of the glass but further modifies its breaking characteristics in that, when broken, the glass sheet will disintegrate into innumerable small and relatively harmless particles instead of breaking into large dangerous pieces or slivers as is the case with ordinary glass sheets.

In the practice of the above process, the glass sheets are ordinarily maintained in a vertical position during the treatment thereof, and it is customary to suspend the sheets from a plurality of relatively small tongs or hooks which engage opposite faces of said sheets near their upper edges. The use of these tongs has not, however, proven entirely satisfactory, due to the fact that when the glass is heated, the jaw portions of the tongs, or the work gripping elements carried thereby, bite into or pinch the softened sheet causing indentations or depressions therein and which remain in the sheet and are quite noticeable after tempering. The marring of the glass sheet in this manner would not be so objectionable were it possible to trim the sheet after tempering, but glass so tempered cannot be subsequently cut since any attempt at cutting would cause a complete shattering of the sheet.

This invention concerns the provision of a novel and improved type of tong which will serve to effectively support the glass sheet during treatment without danger of dropping, while at the same time causing less marring of the sheet upon softening of the glass than the tongs heretofore commonly employed.

Another object of the invention is the provision of a tong embodying means for limiting the movement of the jaw portions toward one another so that the said jaw portions or the work gripping elements carried thereby will not bite into or pinch the softened sheet upon heating thereof, thereby reducing marring of the sheet by the tongs to a minimum.

Other objects and advantages of the invention will become more apparent during the course of the following description when taken in connection with the accompanying drawing.

In the drawing wherein like numerals are employed to designate like parts throughout the same, Fig. 1 is a view of one form of tempering apparatus illustrating the present invention in use, the means for heating the glass sheets being shown in section, and the cooling means in elevation, Fig. 2 is a perspective view of the improved type of tong provided by the present invention for supporting the glass sheet, and Fig. 3 is a transverse sectional view of the tong taken substantially on line 3—3 of Fig. 2.

As brought out above, in the practice of one well known process for tempering glass sheets, the said sheets are first heated to approximately the point of softening of the glass and then suddenly chilled to place the outer surfaces of the sheets under compression and the interiors thereof under tension.

In the embodiment illustrated in the drawing, the means for heating the glass sheets comprises a furnace designated in its entirety by the letter A, while the means for subsequently chilling or cooling the sheets is designated generally by the letter B. The cooling means B is here shown as being arranged directly above the furnace A so that the glass sheet 10, after being heated within the furnace, can be transferred directly to the cooling means without any undue loss of heat and without being adversely affected by atmospheric conditions during the transfer.

The furnace A is preferably of the electrically heated type and is provided with a top opening 11 through which the glass sheets 10 to be treated may be inserted and removed. Any suitable covering can be used for the opening 11 as will be readily understood. For the purpose of heating the furnace, electrical heating elements 12 may be used in conjunction with baffle plates 13 and by means of any conventional indicating and control mechanism, the temperature of the furnace can be regulated to heat the glass sheet 10 to approximately its point of softening which is ordinarily in the neighborhood of 1250° F. for flat glass.

When the glass sheet has been heated to the desired temperature within the furnace, it is lifted therefrom through the top opening 11 and subjected immediately to the action of the cooling means B, said means comprising spaced blower heads 14 and 15 connected by means of flexible conduits 16 and 17 respectively to suitable blowers so that blasts of air can be directed simultaneously upon opposite surfaces of the glass sheet when brought into position between the said blower heads. Each blower head may be provided with a plurality of nipples 18 through which jets of air are directed against the sheet.

It will of course be appreciated that this invention is not limited either to the specific type of means herein disclosed for heating the glass sheets or the particular means disclosed for cooling the same.

According to the present invention, the glass sheet is supported during the treatment thereof by means of a plurality of tongs which engage opposite faces of the sheet closely adjacent its upper edge so that the said sheet is suspended therefrom in a vertical position as shown in Fig. 1, wherein one of the tongs is shown and designated in its entirety by the numeral 19.

The tong comprises a pair of substantially vertical or upstanding complemental tong members or levers 20 and 21 pivotally connected in overlapping relation intermediate their ends as at 22. The tong members 20 and 21 are bent as at a and cross one another at substantially right angles so that the opposite ends thereof may be swung simultaneously toward and away from one another. The upper ends b of the tong members constitute handle portions, while the lower ends c thereof constitute jaw portions.

The jaw portions c of tong members 20 and 21 are formed at their lower ends with thickened parts 22 and 23 respectively which carry the work gripping elements 24 and 25 comprising screws threaded horizontally through the said thickened parts and having smooth rounded inner ends 26 and 27 respectively which engage opposite faces of the glass sheet 10.

Carried at the upper ends of handle portions b of tong members 20 and 21 are rings 28 and 29 respectively through which is looped a third ring 30 adapted to be attached to suitable supporting and/or hoisting means such as the cable 31 in Fig. 1. The rings 28 and 29 constitute, in effect, toggle links which are responsive to upward movement of the ring 30 relative to the tong members to swing the handle portions b together to close the jaw portions c.

With the general type of tong heretofore commonly employed, no means has been provided for limiting the movement of the jaws toward one another, with the result that upon heating of the sheet to substantially its softening point, the said jaws or the work gripping elements carried thereby would be caused to bite into or pinch the thus softened glass. This resulted in an undesirable marring of the glass sheet which is particularly objectionable since the sheet could not be subsequently trimmed to remove the depressions formed by the tongs. To overcome this objection of the prior art tongs, means is herein provided for effectively limiting the movement of the jaw portions c of the tongs toward one another and thereby preventing the gripping elements 26 and 27 from biting into and marring the sheet upon softening of the glass. For this purpose, there is carried by the handle portion b of either tong member 20 or 21, and as here shown by tong member 20, a laterally extending ear or tab 32 through which is threaded a screw 33, the inner end of which is adapted to engage the handle portion of tong member 21. The screw 33 constitutes an adjustable stop member acting to limit the movement of the jaw portions c toward one another.

In the use of the tong above described, the sheet gripping elements 24 and 25 are first adjusted inwardly or outwardly depending upon the thickness of sheet to be supported. The jaw portions c are then separated and slipped over the upper edge of the glass sheet after which an upward movement is imparted to the ring 30 which will result in the jaw portions being moved toward one another and the rounded ends 26 and 27 of the gripping elements 24 and 25 into engagement with the sheet. The stop screw 33 is then moved inwardly until it engages the tong member 21 but not sufficient to move the jaws away from one another. The sheet can then be positioned within the furnace A, and due to the provision of the stop screw, it will be seen that as the glass sheet becomes softened, the said stop screw will prevent the gripping elements from moving further inwardly and biting into or pinching the glass sheet, thereby causing relatively deep impressions or indentations therein. It has been found that the use of this type of tong results in considerably less marring of the glass sheet due to the fact that the gripping elements cannot move any closer together when the sheet is heated and softened. Although this type of tong does not entirely eliminate all marring of the glass sheet, yet the slight marring caused thereby is not nearly so noticeable or apparent as that caused by the use of tongs having no means for limiting movement of the jaws toward one another. This type of tong has also been found to very effectively support the glass sheet without danger of dropping.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A tong for supporting a glass sheet in a vertical position during tempering, comprising a pair of upstanding complemental tong members pivotally connected together in overlapping relation intermediate their ends so that they may be swung toward and away from one another and having oppositely facing jaw portions at the lower ends thereof and handle portions at their upper ends, adjustable sheet gripping elements carried by the jaw portions and adapted to engage opposite faces of the sheet, and an adjustable stop screw carried by one handle portion and engaging the other handle portion for limiting movement of the jaw portions toward one another.

2. A tong for supporting a glass sheet in a vertical position, comprising a pair of upstanding complemental tong members pivotally connected together in overlapping relation intermediate their ends so that they may be swung toward and away from one another and having oppositely facing jaw portions at the lower ends thereof and handle portions at their upper ends, adjustable sheet gripping elements carried by the jaw portions and adapted to engage opposite faces of the sheet, and means for limiting the movement of said jaw portions toward one another.

3. A tong for supporting a glass sheet in a vertical position, comprising a pair of upstanding complemental tong members pivotally connected together in overlapping relation intermediate their ends so that they may be swung toward and away from one another and having oppositely facing jaw portions at the lower ends thereof and handle portions at their upper ends, adjustable sheet gripping elements including screws threaded horizontally through the jaw portions and having rounded inner ends adapted to engage opposite faces of the sheet, and means for limiting the movement of said jaw portions toward one another.

4. A tong for supporting a glass sheet in a vertical position during tempering, comprising a pair of upstanding complemental tong members pivotally connected together in overlapping relation intermediate their ends so that they may be swung toward and away from one another and having oppositely facing jaw portions at the lower ends thereof and handle portions at their upper ends, adjustable sheet gripping elements including screws threaded horizontally through the jaw portions and having rounded inner ends adapted to engage opposite faces of the sheet, and an adjustable stop screw carried by one handle portion and engaging the other handle portion for limiting movement of the jaw portions toward one another.

GERALD WHITE.